United States Patent
Yang

(10) Patent No.: US 6,809,939 B1
(45) Date of Patent: Oct. 26, 2004

(54) SYNCHRONOUS RECTIFYING CONTROL CIRCUIT OF FLYBACK SWITCHING POWER SUPPLY

(75) Inventor: Hui Chiang Yang, Taipei Hsien (TW)

(73) Assignee: Niko Semiconductor Co., Ltd., Taipei (TW)

(*) Notice: Subject to any disclaimer, the term of this patent is extended or adjusted under 35 U.S.C. 154(b) by 0 days.

(21) Appl. No.: 10/627,861

(22) Filed: Jul. 28, 2003

(51) Int. Cl.$^7$ ............................................. H02M 3/335
(52) U.S. Cl. ................................. 363/21.14; 363/21.18
(58) Field of Search ........................... 363/21.12, 21.13, 363/21.14, 21.15, 21.16, 21.17, 21.18, 95, 98, 131

(56) References Cited

U.S. PATENT DOCUMENTS

| | | | | |
|---|---|---|---|---|
| 5,663,874 A | * | 9/1997 | Mader et al. ............ | 363/21.14 |
| 6,049,471 A | * | 4/2000 | Korcharz et al. ........... | 363/20 |
| 6,058,026 A | * | 5/2000 | Rozman ..................... | 363/16 |
| 6,104,623 A | * | 8/2000 | Rozman .................. | 363/21.06 |
| 6,330,169 B2 | * | 12/2001 | Mullett et al. ................ | 363/16 |
| 6,353,544 B1 | * | 3/2002 | Lau .......................... | 363/21.14 |
| 6,400,583 B1 | * | 6/2002 | Lau .......................... | 363/21.13 |
| 6,459,595 B2 | * | 10/2002 | Assow ..................... | 363/21.14 |

* cited by examiner

Primary Examiner—Adolf Berhane
(74) Attorney, Agent, or Firm—Browdy and Neimark, P.L.L.C.

(57) ABSTRACT

A synchronous control circuit of a flyback switching power supply is connected to a secondary side of a transformer. The synchronous control circuit has several sets of power source ends and a set of induction ends. One output end of the power source ends is connected to a rectifying circuit for rectifying the voltage waveform of the power source ends. The induction ends are connected with a rectifying diode to form a detection end. A synchronous control circuit is connected with the power source ends and the detection end, and has a synchronous input end, a control end, and a waveform adjustment end. The synchronous input end is used for input of a synchronous signal. The control end is connected to the rectifying circuit. The waveform adjustment end is connected to a resistor for controlling the rectifying circuit to generate a uniform rectifying response period.

17 Claims, 6 Drawing Sheets

US 6,809,939 B1

SYNCHRONOUS RECTIFYING CONTROL CIRCUIT OF FLYBACK SWITCHING POWER SUPPLY

FIELD OF THE INVENTION

The present invention relates to a synchronous rectifying control circuit of a flyback switching power supply and, more particularly, to a control circuit used on a secondary side circuit of a flyback switching power supply and capable of synchronously controlling a plurality of sets of rectifying outputs and synchronously adjusting the waveforms of rectifying outputs.

BACKGROUND OF THE INVENTION

In existent DC power supply devices like AC to DC switching power supplies, in order to shrink the volume, a high-frequency pulse width modulation (PWM) controller is exploited to control the DC output voltage. As shown in FIG. 1, the front-stage circuit and the rear-stage circuit of a transformer T1 are divided into a primary side 101 and a secondary side 102. A phototransistor 111 and a photodiode 112 between the primary side 101 and the secondary side 102 are used to separate electric signals of the primary side 101 and the secondary side 102. Optical signals can be used to feed back the voltage or current output variation signal of the secondary side 102 to the primary side 101 for synchronous adjustment of the voltage and current variation of the primary side 101 and the secondary side 102, or can be used as feedback signals for over-current and short-circuit protection.

In the prior art, a flyback power supply is primarily a circuit for converting an AC voltage into a DC voltage. It is based on the following principle. When a field-effect transistor (FET) Q1 on the primary side 101 conducts, energy cannot be transferred through a rectifying diode D1 due to polarity inversion of the primary side and the secondary side, and is stored on the transformer T1. After the conduction period of the FET Q1 is over, the polarity of the transformer T1 inverses, and the rectifying diode D1 on the secondary side conducts to release energy stored on the transformer T1. However, when the rectifying diode D1 conducts, there is a voltage drop of about 0.4–1.5V according to the magnitude of the output load. This voltage drop multiplied by the load current is the dissipation power loss of the rectifying diode D1. If the load current is large, the output power source efficiency of the DC power supply device is much reduced.

For an existent flyback switching power supply, there generally is more than one set of output power sources. If all the output power sources are to have synchronous output voltages and waveforms, a very complicated circuit is required. Therefore, in order to save costs, most of existent flyback switching power supplies have no synchronous output function, and the output voltages and waveforms thereof need to be adjusted separately.

SUMMARY OF THE INVENTION

The primary object of the present invention is to provide a synchronous rectifying control circuit of a flyback switching power supply, which is connected at a secondary side of a transformer and has a plurality of sets of power source ends and a set of induction ends. The power source ends comprise a first power source output end and a secondary power source output end. The set of induction ends comprises a first induction end and a second induction end. The secondary power source output end of the power source ends is connected to a rectifying circuit for rectifying the voltage waveform between the first power source output end of the power source ends and a reference potential end. The first induction end of the set of induction ends is connected to a rectifying diode, which is used to rectify the first induction end and the reference potential end to form a detection end having a waveform with the same phase as the power source ends. A synchronous control circuit is connected to the first power source output and the detection end, and comprises a synchronous input end, a control end and a waveform adjustment end. The synchronous input end is used for input of a synchronous signal. The control end is connected to the rectifying circuit and used to synchronously control the rectifying circuit to generate a uniform rectifying response period, hence accomplishing synchronous adjustment of several sets of output voltage waveforms.

Another object of the present invention is to provide a synchronous rectifying control circuit of a flyback switching power supply, wherein a comparator is provided. The comparator has a positive input end, a negative input end and an output end. The positive input end connects a first resistor to the detection end and connects a second resistor to the reference potential end. The negative input end connects a third resistor to the first power source output end and connects a fourth resistor to the reference potential end. The output end connects a fifth resistor for feedback to the positive input end to convert the waveform of the detection end into a waveform having an apparent slope, hence accomplishing synchronous adjustment of the control circuit to increase or decrease the response period of the rectifying circuit.

Yet another object of the present invention is to provide a synchronous rectifying control circuit of a flyback switching power supply, which is connected at a secondary side of a transformer and has a plurality of sets of power source ends and a set of induction ends. The power source ends comprise a first power source output end and a secondary power source output end. The set of induction ends comprises a first induction end and a second induction end. The drain (D) of an FET is connected to the second power source output end and the source (S) of the FET is connected to a reference potential end so that the voltage waveform between the first power source output end and the reference potential end can be rectified through conducting or shutting off the FET. The first induction end is connected to a rectifying diode to rectify the first induction end and the reference potential end to form a detection end having a waveform with the same phase as the first power source output end. A comparator is used to convert the waveform at the detection end into a waveform having an apparent slope. A drive control circuit has a control input end and a control output end. The control input end is connected to the output end of the comparator and the control output end is connected to a gate (G) of the FET to drive and control the FET for increasing or decreasing the rectifying response period.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

Figure 1:
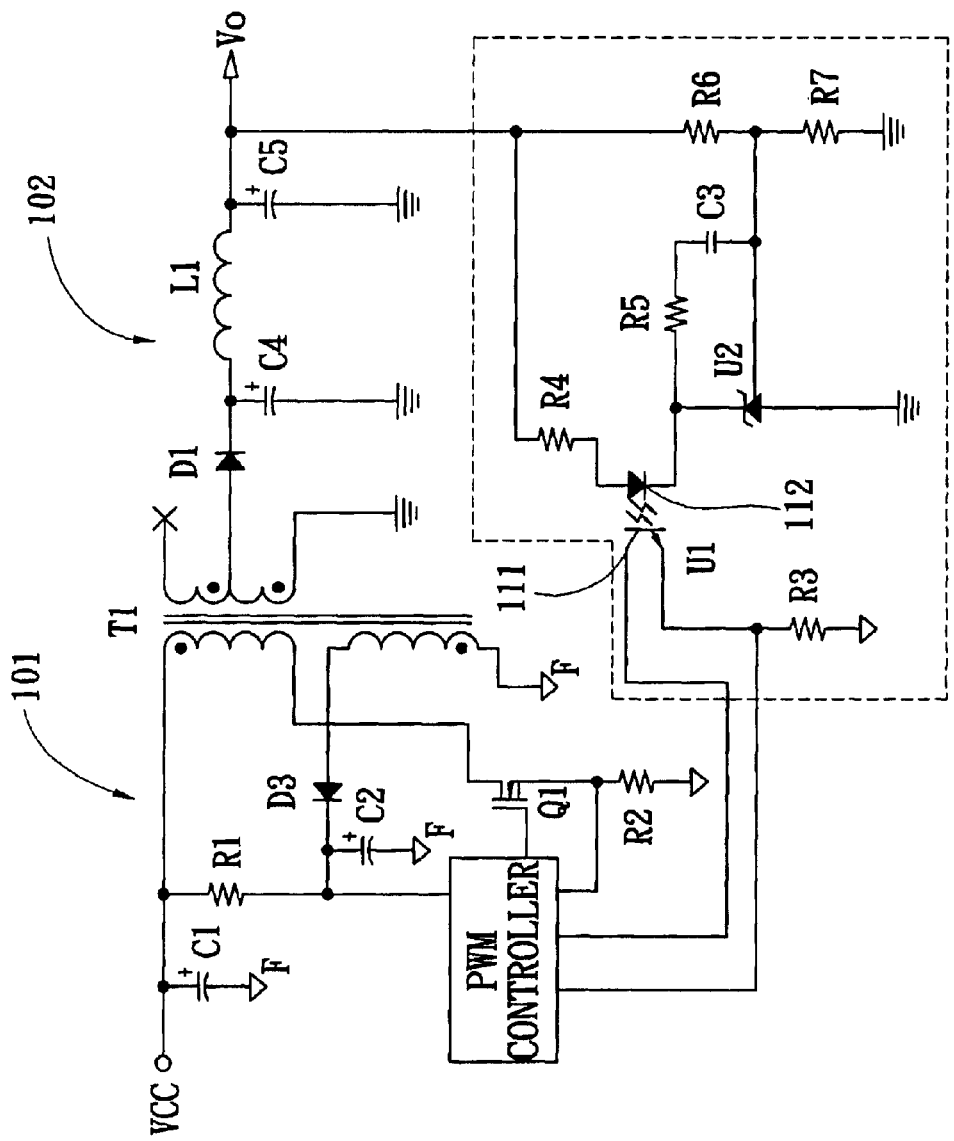
FIG. 1 is a circuit diagram of a conventional flyback switching power supply.
Figure 2:
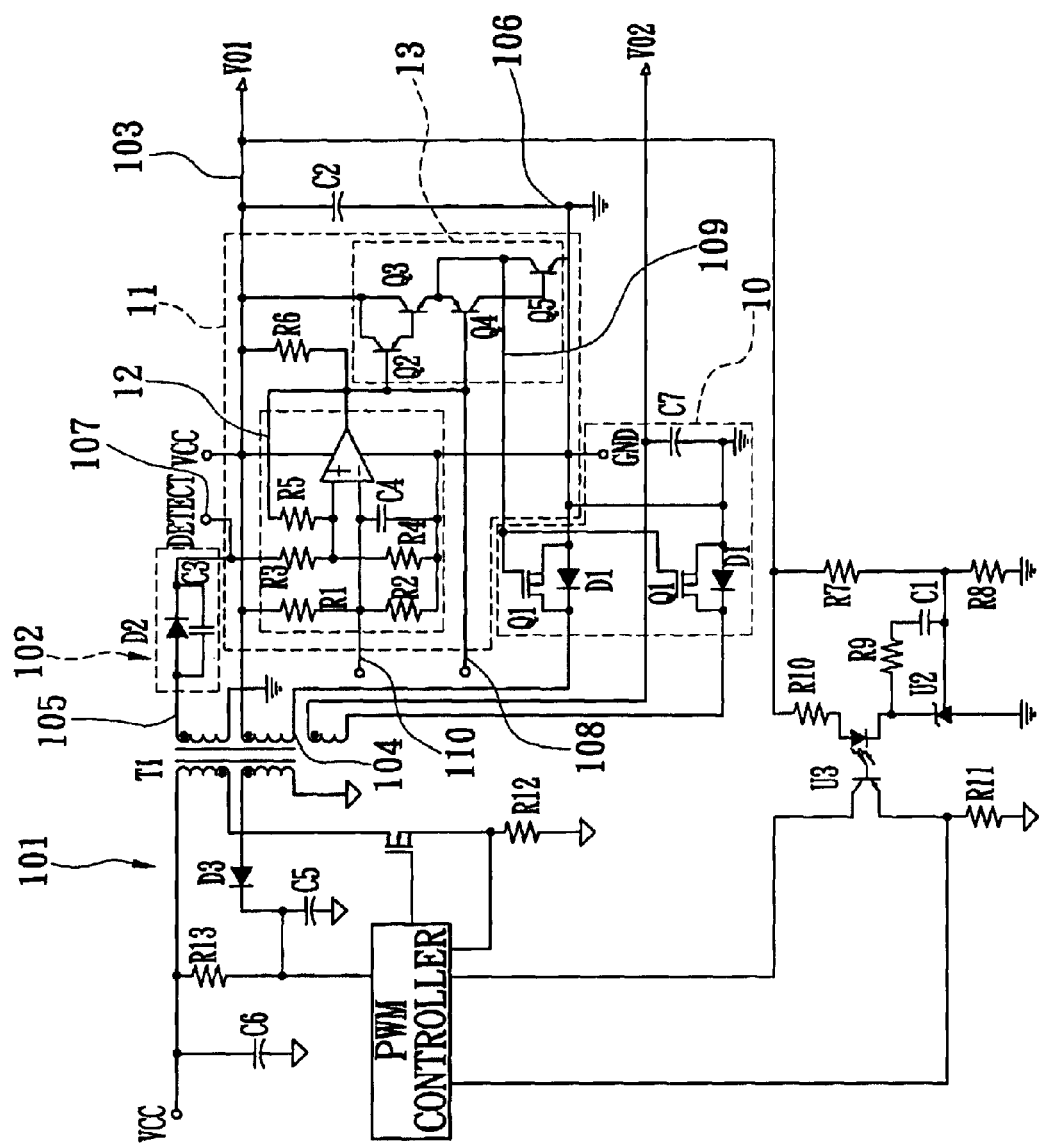
FIG. 2 is a circuit diagram according to a first embodiment of the present invention.
Figure 3:
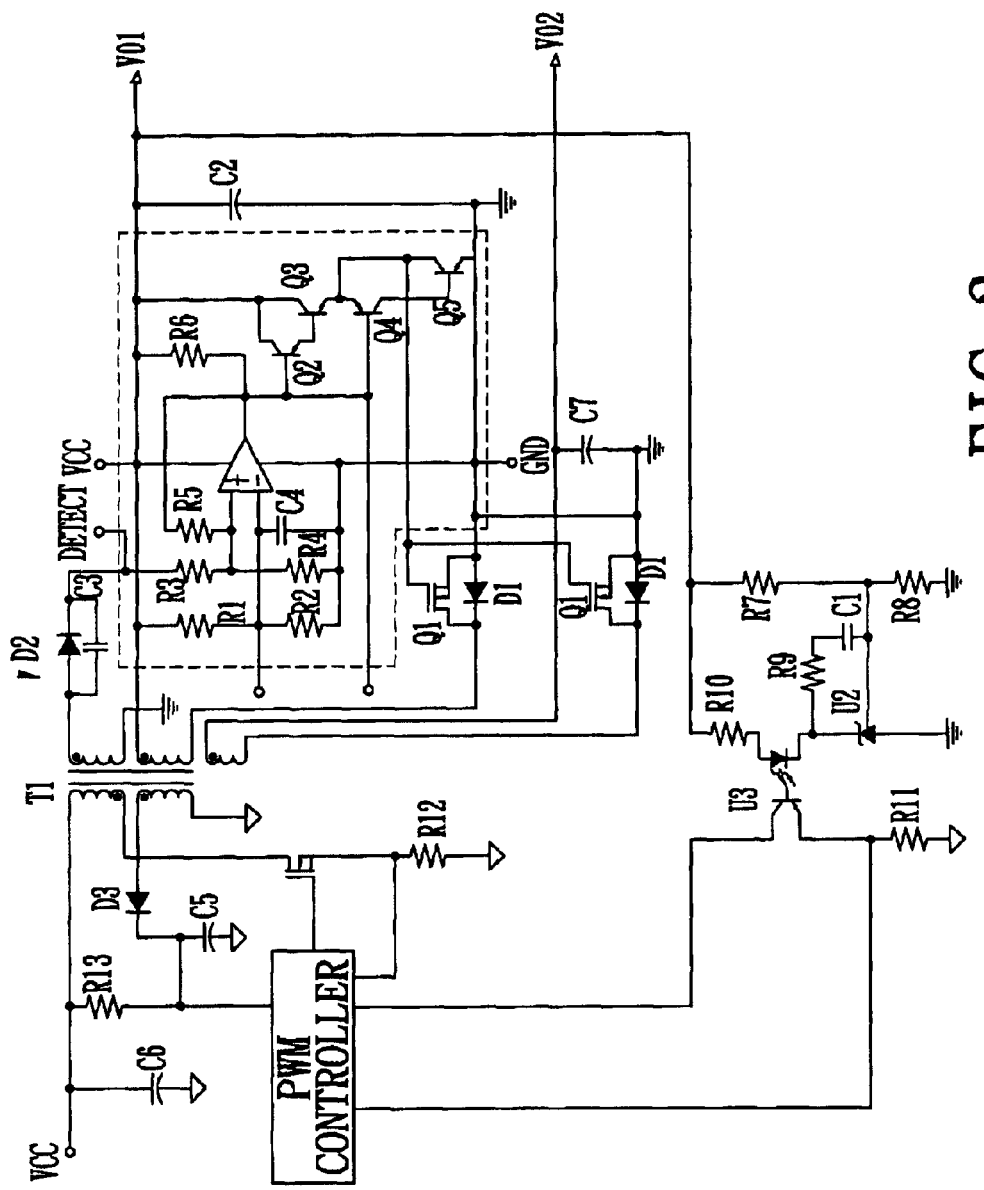
FIG. 3 is a circuit diagram according to a second embodiment of the present invention.
Figure 4:
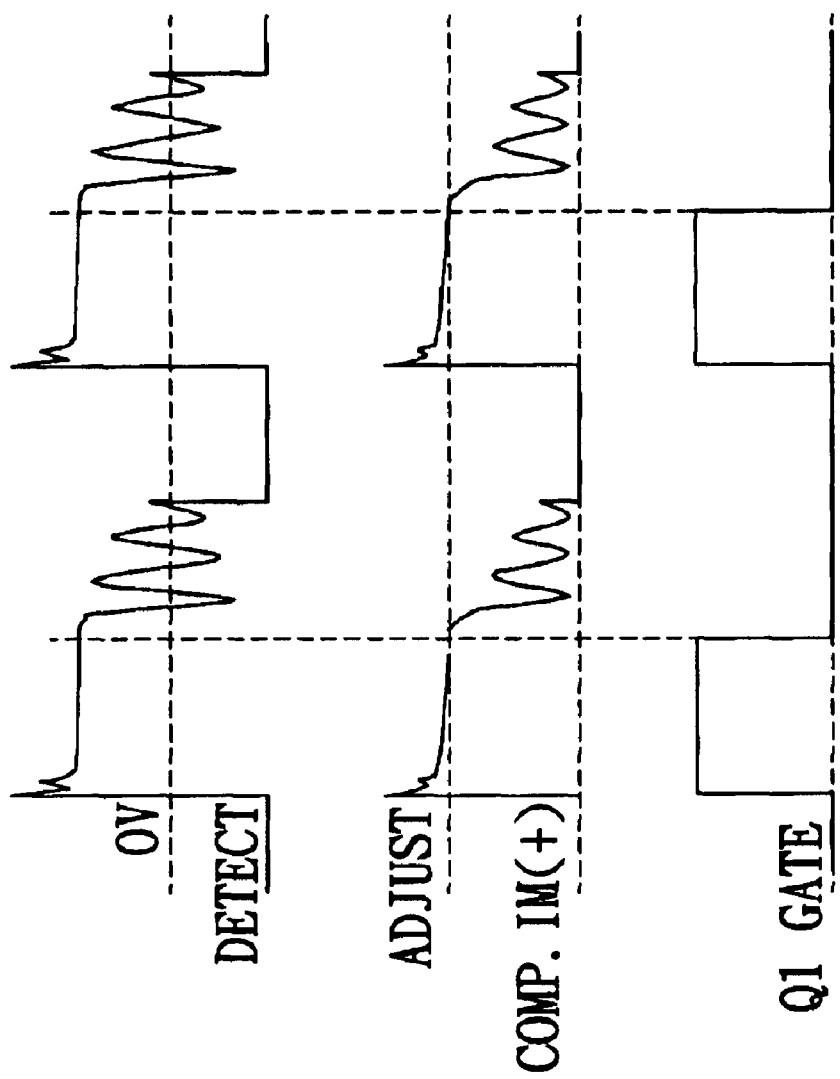
FIG. 4 is a waveform diagram of a control circuit of the present invention.

As shown in FIGS. 2, 3 and 4, the present invention provides a control circuit, which mainly applies to a flyback switching power supply having a set or several sets of output power sources, and is used to synchronously control the voltage waveforms of several sets of outputs or synchronously adjust the rectifying response periods of several sets of outputs.

As shown in FIG. 2, a synchronous rectifying control circuit 10 of the present invention is connected at a secondary side 102 of a transformer T1 in the flyback switching power supply. A plurality of power source ends is provided at the secondary side of the transformer T1. In this embodiment, the transformer T1 has two sets of output coils. A first power source output end 103 and a second power source output end 104 are provided at the power source end of each set of the output coils. An induction end having a set of output coils and provided at the secondary side of the transformer T1 has a first induction end 105 and a second induction end 106. The second induction end 106 is a reference potential end, and can be a ground end.

The synchronous rectifying control circuit of the present invention mainly comprises a plurality of sets of rectifying circuits 10 and a synchronous control circuit 11. The plurality of sets of rectifying circuits 10 are respectively connected to the second power source output ends 104 of the plurality of sets of power source ends, and are used to rectify and output the voltage waveforms between the first power source output ends 103 and the reference potential end 106. The rectifying circuit 10 is composed of an FET Q1 and a diode D1. The diode D1 is shunted between a source (S) and a drain (D) of the FET Q1. The source (S) of the FET Q1 is connected to the positive pole of the diode D1, and is also connected to the reference potential end 106. The drain (D) of the FET Q1 is connected to the negative pole of the diode D1, and is also connected to the second power source output end 104 of the power source end. The first induction end 105 of the induction ends connects a rectifying diode D2 to rectify the output power source between the first induction end 105 and the reference potential end 106 to form a detection end 107 having a waveform with the same phase as the power source end.

The synchronous control circuit 11 is connected to the first power source output end 103 and the detection end 107, and comprises a first synchronous input end 108, a control end 109 and a waveform adjustment end 110. The synchronous input end 108 is used for input of a synchronous signal. The synchronous signal is generated by a PWM controller at the primary side 101 of the transformer T1. The control end 109 is connected to a gate (G) of the FET Q1 in the plurality sets of rectifying circuits 10, and is used to synchronously control the rectifying circuits 10 to generate a uniform rectifying response period.

The waveform adjustment end 110 can be externally connected to a resistor for adjusting its DC voltage to change the voltage waveform on the control end 109 and control the on or off response period of the FET Q1, thereby reducing or increasing the synchronous rectifying response period. If the waveform adjustment end 110 connects a resistor to the first power source output end 103, the synchronous rectifying response period of the rectifying circuit 10 can be reduced. If the waveform adjustment end 110 connects a resistor to the reference potential end 106, the synchronous rectifying response period of the rectifying circuit 10 can be increased.

The synchronous control circuit 11 is composed of a comparison circuit 12 and a synchronous drive circuit 13. The comparison circuit 12 has a comparator U1, which has a positive input end U+, a negative input end U−, and an output end Uout. The positive input end U+ connects a first resistor R3 to the detection end 107, and connects a second resistor R4 to the reference potential end 106. The negative input end U− connects a third resistor R1 to the first power source output end 103, and connects a fourth resistor R2 to the reference potential end 106. The output end Uout connects a fifth resistor R5 for feedback to the positive input end U+ to convert the waveform of the detection end 107 into a more ideal waveform having an apparent slope.

The synchronous drive circuit 13 is composed of transistors Q2, Q3, Q4 and Q5. The base of the transistor Q2 is connected to the output end Uout of the comparator U1, the emitter thereof is connected to the base of the transistor Q3, and the collector thereof is connected to the collector of the transistor Q3 and then to the first power source output end 103. The emitter of the transistor Q3 is connected to the emitter of the transistor Q4 and then to the collector of the transistor Q5 to form the control end. The base of the transistor Q4 is connected to the output end of the comparator U1 to form the synchronous input end 108. The collector of the transistor Q4 is connected to the base of the transistor Q5. The emitter of the transistor Q5 is connected to the reference potential end. The synchronous drive circuit 13 can thus accept potential control of the output end Uout of the comparator U1 and the synchronous control of the synchronous input end 108 to let the FET Q1 be on or off, hence generating a synchronous rectifying response period. FIG. 4 shows the response period waveforms of the detection end 107, the waveform adjustment end 110 and the FET Q1 in the control circuit. The potential of the waveform adjustment end 110 can be used to adjust the conduction period of the transistor Q1.

Figure 5:
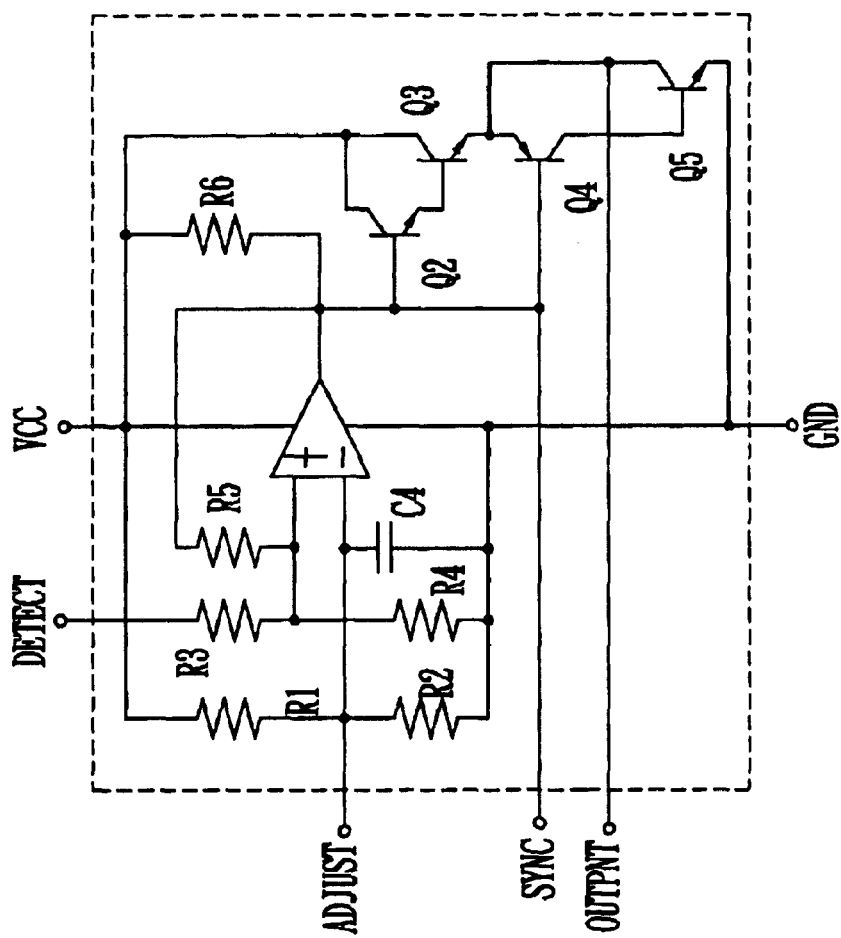
FIG. 5 is an internal circuit diagram of an IC according to the first embodiment of the present invention.

In the first embodiment of the present invention, the comparison circuit 12 and the synchronous drive circuit 13 in the control circuit 11 can be packaged into an IC with eight pins. The internal circuit of the IC is shown in FIG. 5. The pins at least comprises a power source pin Vcc (103), a ground pin GND (106), a detection end pin DETECT (107), a waveform adjustment end pin ADJUST (110), a synchronous input end pin SYNC (108) and a control end pin OUTPUT (109).

Figure 6:
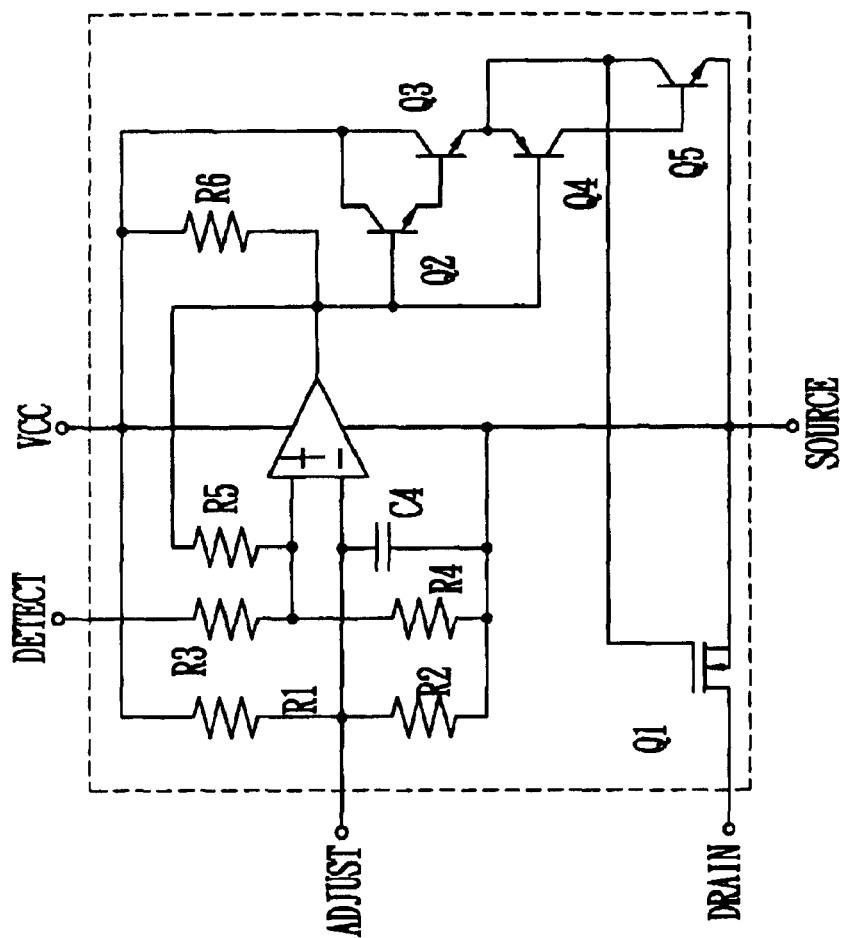
FIG. 6 is an internal circuit diagram of an IC according to the second embodiment of the present invention.

As a second embodiment shown in FIG. 3, the control circuit of the present invention can also apply to a circuit having a single output power source. It differs from the first embodiment only in that the synchronous signal input end is omitted. The control circuit of the second embodiment can be packaged into an IC with five pins. In order to lower the cost of circuit, the FET is also packaged into the IC. The internal circuit is shown in FIG. 6. The pins at least comprises a power source pin Vcc (103), a ground pin GND (106), a detection end pin DETECT (107), a waveform adjustment end pin ADJUST (110) and a rectifying output end pin DRAIN (104).

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A synchronous rectifying control circuit of a flyback switching power supply connected to a secondary side of a transformer in said flyback switching power supply, said circuit at least comprising:
    a plurality of sets of power source ends arranged at an output end of a secondary side coil of said transformer and having a first power source output end and a secondary power source output end;
    a plurality of rectifying circuits connected with said secondary power source output end of said power source ends and used to rectify a voltage waveform between said first power source output end of said power source ends and a reference potential end;
    a set of induction ends arranged at the output end of said secondary said coil of said transformer and having a first induction end and a second induction end, said second induction end being said reference potential end, said first induction end being connected to a rectifying diode, which is used to rectify said first induction end and said reference potential end to form a detection end having a waveform with the same phase as said power source ends; and
    a synchronous control circuit connected to said first power source output of said power source ends and said detection end and having a synchronous input end and a control end, said synchronous input end being used for input of a synchronous signal, said control end being connected to said rectifying circuits and used to control synchronously said rectifying circuits to generate a uniform rectifying response period.

2. The synchronous rectifying control circuit of a flyback switching power supply as claimed in claim 1, wherein each of said rectifying circuits is composed of an FET and a diode, said diode is shunted between a source and a drain of said FET, said drain of said FET is connected to a negative pole of said diode and connected to said second power source output end of said power source ends, and a gate of said FET is connected to said control end of said synchronous control circuit.

3. The synchronous rectifying control circuit of a flyback switching power supply as claimed in claim 1, wherein said reference potential end in said rectifying circuit and said induction end is a ground.

4. The synchronous rectifying control circuit of a flyback switching power supply as claimed in claim 1, wherein said input signal inputted from said synchronous input end in said synchronous control circuit is a synchronous signal generated by a PWM controller at a primary side of said transformer.

5. The synchronous rectifying control circuit of a flyback switching power supply as claimed in claim 1, wherein said synchronous control circuit further has a waveform adjustment end externally connected to a resistor for adjusting the DC voltage of said waveform adjustment end to change the voltage output of said rectifying circuit, thereby reducing or increasing a synchronous rectifying response period.

6. The synchronous rectifying control circuit of a flyback switching power supply as claimed in claim 5, wherein said waveform adjustment end connects said resistor to said first power source output end to reduce the synchronous rectifying response period of said rectifying circuit.

7. The synchronous rectifying control circuit of a flyback switching power supply as claimed in claim 5, wherein said waveform adjustment end connects said resistor to said reference potential end to increase the synchronous rectifying response period of said rectifying circuit.

8. The synchronous rectifying control circuit of a flyback switching power supply as claimed in claim 1, wherein a comparator is provided in said synchronous control circuit, said comparator has a positive input end, a negative input end and an output end, said positive input end connects a first resistor to said detection end and connects a second resistor to said reference potential end, said negative input end connects a third resistor to said first power source output end and connects a fourth resistor to said reference potential end, said output end connects a fifth resistor for feedback to said positive input end to convert the waveform of said detection end into a waveform having an apparent slope.

9. The synchronous rectifying control circuit of a flyback switching power supply as claimed in claim 8, wherein a synchronous drive circuit is further provided in said synchronous control circuit, said synchronous drive circuit is composed of a plurality of transistors, and is connected to said synchronous input end, said control end, said output end of said comparator, said first power source output end and said reference potential end to drive and control said rectifying circuits for generating a synchronous rectifying response period.

10. The synchronous rectifying control circuit of a flyback switching power supply as claimed in claim 1, wherein said synchronous control circuit can be packaged into an IC with eight pins, which at least comprises a power source pin, a ground pin, a detection end pin, a waveform adjustment end pin, a synchronous input end pin and a control end pin.

11. A rectifying control circuit of a flyback switching power supply connected at a secondary side of a transformer in said flyback switching power supply, said circuit at least comprising:
    a set of power source ends arranged at an output end of a secondary side coil of said transformer and having a first power source output end and a secondary power source output end;
    a FET, wherein a drain thereof is connected to said second power source output end of said power source ends and a source thereof is connected to a reference potential end so that the voltage waveform between said first power source output end and said reference potential end can be rectified through conducting or shutting off said FET;
    a set of induction ends arranged at the output end of the second side coil of said transformer and having a first induction end and a second induction end, said second induction end being said reference potential end, said first induction end being connected to a rectifying diode to rectify said first induction end and said reference potential end to form a detection end having a waveform with the same phase as said power source ends;
    a comparator having a positive input end, a negative input end and an output end, said positive input end connecting a first resistor to said detection end and connecting a second resistor to said reference potential end, said negative input end connecting a third resistor to said first power source output end and connecting a fourth resistor to said reference potential end, said output end connecting a fifth resistor for feedback to said positive input end to convert the waveform of said detection end into a waveform having an apparent slope; and a drive control circuit composed of a plurality of transistors to form a control input end and a control output end, said control input end being connected to said output end of said comparator, and said control output end being connected to said gate of said FET to drive and control said FET for increasing or decreasing the rectifying response period.

12. The synchronous rectifying control circuit of a flyback switching power supply as claimed in claim 11, wherein a diode is shunted between said source and said drain of said FET, and said drain of said FET is connected to a negative pole of said diode and connected to said second power source output end.

13. The synchronous rectifying control circuit of a flyback switching power supply as claimed in claim 11, wherein said reference potential end is a ground.

14. The synchronous rectifying control circuit of a flyback switching power supply as claimed in claim 11, wherein said negative input end of said comparator forms a waveform adjustment end and said waveform adjustment end is externally connected to a resistor for adjusting its DC voltage to change the voltage output of said FET, thereby reducing or increasing a rectifying conduction period.

15. The synchronous rectifying control circuit of a flyback switching power supply as claimed in claim 14, wherein said waveform adjustment end connects said resistor to said first power source output end to reduce a synchronous rectifying response period of said rectifying circuit.

16. The synchronous rectifying control circuit of a flyback switching power supply as claimed in claim 14, wherein said waveform adjustment end connects said resistor to said reference potential end to increase a synchronous rectifying response period of said rectifying circuit.

17. The synchronous rectifying control circuit of a flyback switching power supply as claimed in claim 11, wherein said FET, said comparator and said drive circuit are packaged into an IC with five pins, and the IC at least comprises a power source pin, a ground pin, a detection end pin, a waveform adjustment end pin, and a rectifying output pin.

* * * * *